US008356361B2

(12) United States Patent
Werner et al.

(10) Patent No.: US 8,356,361 B2
(45) Date of Patent: Jan. 15, 2013

(54) SECURE CO-PROCESSING MEMORY CONTROLLER INTEGRATED INTO AN EMBEDDED MEMORY SUBSYSTEM

(75) Inventors: Jeremy Isaac Nathaniel Werner, San Jose, CA (US); Venkat Natarajan, Cupertino, CA (US); Willy Obereiner, San Jose, CA (US); Joe Yuen Tom, Foster City, CA (US); George Minassian, Cupertino, CA (US); Russell Barck, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 1144 days.

(21) Appl. No.: 11/614,309

(22) Filed: Dec. 21, 2006

(65) Prior Publication Data

US 2008/0109903 A1 May 8, 2008

Related U.S. Application Data

(60) Provisional application No. 60/864,730, filed on Nov. 7, 2006.

(51) Int. Cl.
*G06F 9/00* (2006.01)

(52) U.S. Cl. .............. 726/34; 726/2; 726/26; 713/200; 709/225; 711/103; 711/164

(58) Field of Classification Search .............. 726/34, 726/2, 26; 713/200; 709/225, 229, 253; 711/103, 164; 705/29, 39; 235/492
See application file for complete search history.

(56) References Cited

U.S. PATENT DOCUMENTS

| | | | | | |
|---|---|---|---|---|---|
| 5,386,471 | A | * | 1/1995 | Bianco | 713/162 |
| 5,923,759 | A | * | 7/1999 | Lee | 713/159 |
| 6,142,683 | A | * | 11/2000 | Madduri | 717/128 |
| 6,434,650 | B1 | * | 8/2002 | Morris et al. | 710/110 |
| 6,775,776 | B1 | * | 8/2004 | Vogt et al. | 713/186 |
| 7,155,615 | B1 | * | 12/2006 | Silvester | 713/185 |
| 7,315,238 | B2 | * | 1/2008 | Chambers et al. | 340/426.35 |
| 2002/0166065 | A1 | * | 11/2002 | Cheung et al. | 713/200 |
| 2003/0084309 | A1 | * | 5/2003 | Kohn | 713/189 |
| 2004/0010656 | A1 | * | 1/2004 | Chiao et al. | 711/103 |
| 2004/0039940 | A1 | * | 2/2004 | Cox et al. | 713/201 |
| 2004/0073672 | A1 | * | 4/2004 | Fascenda | 709/225 |
| 2004/0177166 | A1 | * | 9/2004 | Ellison et al. | 709/253 |
| 2004/0177215 | A1 | * | 9/2004 | Nagamasa et al. | 711/103 |
| 2004/0232247 | A1 | * | 11/2004 | Tsunoda et al. | 235/492 |
| 2005/0021723 | A1 | * | 1/2005 | Saperia | 709/223 |
| 2005/0171898 | A1 | * | 8/2005 | Bishop et al. | 705/39 |
| 2005/0216651 | A1 | * | 9/2005 | Tanabiki et al. | 711/100 |

(Continued)

OTHER PUBLICATIONS

International Search Report for PCT/US 07/83830 dated Jun. 26, 2008.

(Continued)

*Primary Examiner* — Kim Vu
*Assistant Examiner* — Sayed Beheshti Shirazi
(74) *Attorney, Agent, or Firm* — Turocy & Watson, LLP

(57) ABSTRACT

An architecture is presented that facilitates integrated security capabilities. A memory module is provided that comprises non-volatile memory that stores security software and a security processor that accesses the security software from the nonvolatile memory and performs security functions based on the security software stored. Further, a host processor located outside of the memory module arbitrates with the security processor for access to the non-volatile memory. The memory module in communication with the host processor establishes a heightened level of security that can be utilized in authentication services and secure channel communications.

18 Claims, 12 Drawing Sheets

U.S. PATENT DOCUMENTS

2006/0179324 A1* 8/2006 Hatakeyama ............... 713/187
2006/0265734 A1* 11/2006 Chen et al. .................... 726/2
2007/0056042 A1* 3/2007 Qawami et al. ............... 726/26
2008/0195641 A1* 8/2008 Tischer et al. ................ 707/101

OTHER PUBLICATIONS

Written Opinion for PCT/US 07/83830 dated Jun. 26, 2008.

* cited by examiner

SECURE CO-PROCESSING MEMORY CONTROLLER INTEGRATED INTO AN EMBEDDED MEMORY SUBSYSTEM

CROSS-REFERENCE TO RELATED APPLICATIONS

This application claims the benefit of U.S. Provisional Patent Application Ser. No. 60/864,730, entitled "SECURE CO-PROCESSING MEMORY CONTROLLER INTEGRATED INTO AN EMBEDDED MEMORY SUBSYSTEM", which was filed Nov. 7, 2006. The entirety of the aforementioned application is hereby incorporated by reference as if fully set forth herein.

BACKGROUND

Robust security is imperative for network-based systems, particularly for applications that deal with sensitive information, to prevent unauthorized agents from intercepting, corrupting or publishing sensitive data. A suitable information security system must perform with minimum disruption to users to ensure that authorized users are neither erroneously denied access nor unduly restricted in their duties.

To complicate matters, there are certain restrictions in this environment that impact on the ability to integrate security measures into the system. The host processor employed in this environment may have a low processing capability as well as limited resource capability, both in terms of code size, and the available memory to execute the code. Moreover, due to aforementioned processing limitation, extensive computations that are typical of many security schemes are not possible.

Another major problem common to security-based systems is the vulnerability of the security functionality. Compromise of the security functionality results in system failures. This is a major concern, since attackers using sophisticated techniques have compromised a wide variety of existing systems, resulting in the intercepting, corrupting or publishing of sensitive data. Therefore, it is imperative to include adequate security mechanisms to protect such systems.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a memory module that facilitates integrated security capabilities. The memory module comprises non-volatile memory that stores security software and a security processor that accesses the security software from the nonvolatile memory and performs security functions based on the security software stored. Accordingly, the security processor controls the non-volatile memory and monitors all traffic to and from the non-volatile memory.

Further, a host processor located outside of the memory module arbitrates with the security processor for access to the non-volatile memory. The security processor provides for concurrent processing of security protocols while the host processor executes normal functions, alleviating the host processor from having to execute interrupts associated with security functions. The security processor sits in series with the host processor and the nonvolatile memory. Further, the memory module also includes volatile memory used for primary storage that communicates with the host processor. The memory module in communication with the host processor establishes a heightened level of security that can be utilized in authentication services and secure channel communications.

In another aspect of the claimed subject matter, a security processor and flash memory are integrated into a single integrated circuit/silicon chip. Security software is directly embedded in the flash memory for use by the security processor to provide integrated security capabilities at a chip level. The security processor accesses the security software from the flash memory and performs security functions based on the specific security software stored. The security processor also arbitrates with a host processor to control access to the flash memory. Furthermore, both the security processor and host processor coordinate read/write access to the flash memory so as to optimize processor/memory utilization while ensuring a heightened level of security. Alternatively, security software may also be embedded in another flash memory that sits in series with the integrated security processor and flash memory. The integrated security processor then accesses the separate flash memory and arbitrates with the host processor to control access to the separate flash memory and to coordinate read/write access to the separate flash memory.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
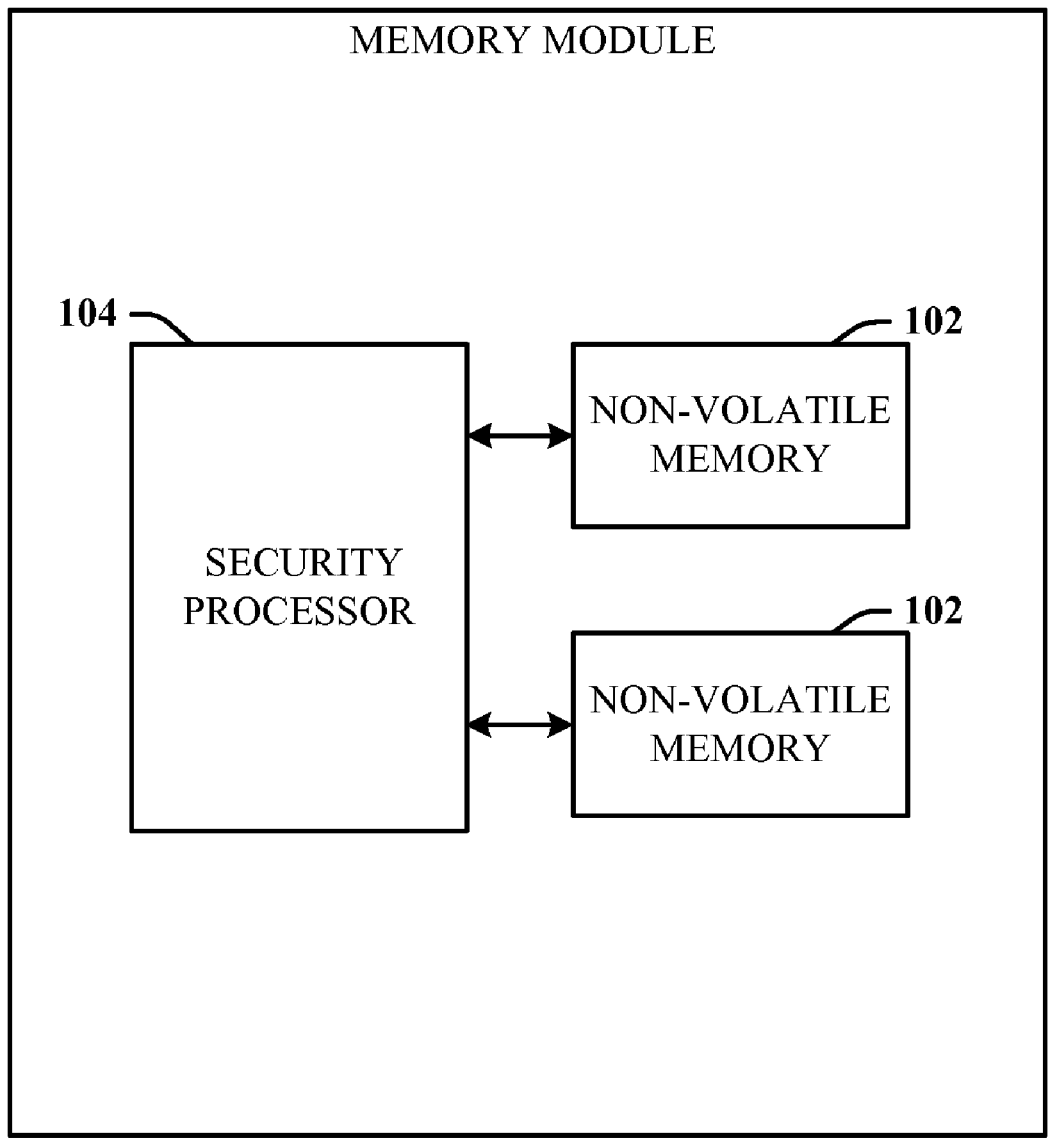
FIG. 1 illustrates a block diagram of a memory module.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Additionally, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer-readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, and flash devices in accordance with the claimed subject matter.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Security is imperative for network-based systems, particularly for applications that deal with sensitive information, to prevent unauthorized agents, in the form of hardware and/or software, from intercepting, corrupting or publishing sensitive data. As stated supra, suitable information security system must perform with minimum disruption to users to ensure that authorized users are neither erroneously denied access nor unduly restricted in their duties. Accordingly, the following subject matter optimizes processor utilization and creates a heightened level of security in user applications.

A memory module that facilitates integrated security capabilities is disclosed. The memory module arbitrates with a host processor located outside of the memory module for access to the non-volatile memory. Optionally, the non-volatile memory could be shadowed to volatile memory for faster execution, or a large scratch pad could be provided for calculations. The security processor provides for concurrent processing of security protocols while the host processor executes normal functions, alleviating the host processor from having to execute interrupts associated with security functions. The memory module in communication with the host processor establishes a heightened level of security that can be utilized in authentication services and secure channel communications.

Referring initially to the drawings, FIG. 1 illustrates a memory module 100 that facilitates integrated security capabilities in accordance with an innovative aspect. The memory module is a package of multiple chips or integrated circuits, wherein one integrated circuit houses a security processor 104 and another integrated circuit houses non-volatile memory 102. The integrated circuits are then coupled together to form the memory module 100. Furthermore, the non-volatile memory 102 of the memory module 100 stores security software for use by the security processor 104. The non-volatile memory 102 is typically flash memory, but can be any type of non-volatile memory typically used for the task of secondary storage, or long-term persistent storage. Furthermore, one or more non-volatile memory 102 can be included in the memory module 100. If more than one non-volatile memory 102 is included, the non-volatile memory 102 is not required to be of the same type and/or density.

All or a portion of the security software includes password authentication software, shared key authentication software, public key infrastructure (PKI) authentication software, integrity check software, encryption/decryption software, anti-virus software, anti-spyware software, secure communication software, and any other type of security software available. All or a portion of the security software is directly embedded into the non-volatile memory 102 to provide integrated security capabilities within the memory module 100. The security processor 104 accesses the security software from the non-volatile memory 102 and performs security functions based on the specific security software stored. The security processor 104 controls the entire non-volatile memory storage and monitors all traffic to and from the non-volatile memory components 102.

Figure 2:
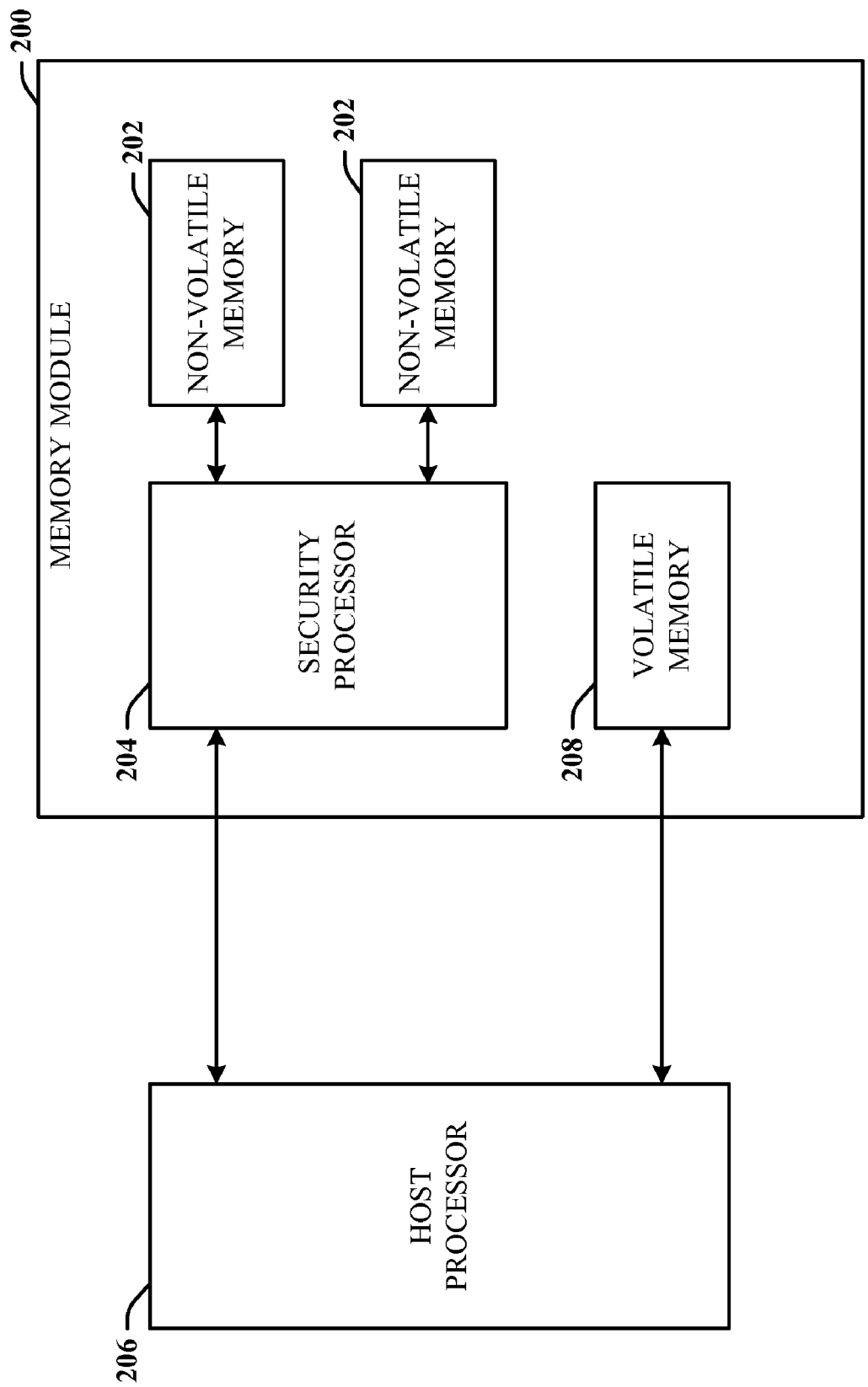
FIG. 2 illustrates a block diagram of the memory module wherein a host processor is in communication with the memory module.

In another implementation illustrated in FIG. 2, the memory module 200 communicates with an outside or host processor 206 via a split or shared bus, such as a NOR and NAND bus, to facilitate the integrated security capabilities. If more than one bus is utilized, both can be functioning in parallel. The host processor 206 is a typical applications processor that handles communications and runs applications. The host processor 206 can be a baseband processor or application processor for a mobile handset, personal data assistant (PDA), automotive industrial control, set-top boxes, or the like. As stated supra, the memory module 200 includes non-volatile or flash memory 202 that stores security software and a security processor 204 that accesses the security software and performs security functions based on the specific security software stored. Accordingly, the security processor 204 sits in series with the host processor 206 and the flash memory 202.

Further, as shown in FIG. 2, the memory module 200 also includes volatile memory or random access memory (RAM) 208 used for primary storage that communicates with the host processor 206. Accordingly, the security processor 204 controls the entire flash memory storage and monitors all traffic to and from the flash memory components 202. Further, the security processor 204 provides for concurrent processing of security protocols while the host processor 206 executes normal functions. However, processing security protocols does not imply that the data being processed is secure or not secure. Allowing the security processor 204 to control the security functionality of the flash memory 202, alleviates the host processor 206 from having to execute interrupts associated with security functions. Accordingly, both the security processor 204 and the host processor 206 coordinate read/write access to the flash memory 202 so as to optimize processor/memory utilization while ensuring a heightened level of security.

Figure 3:
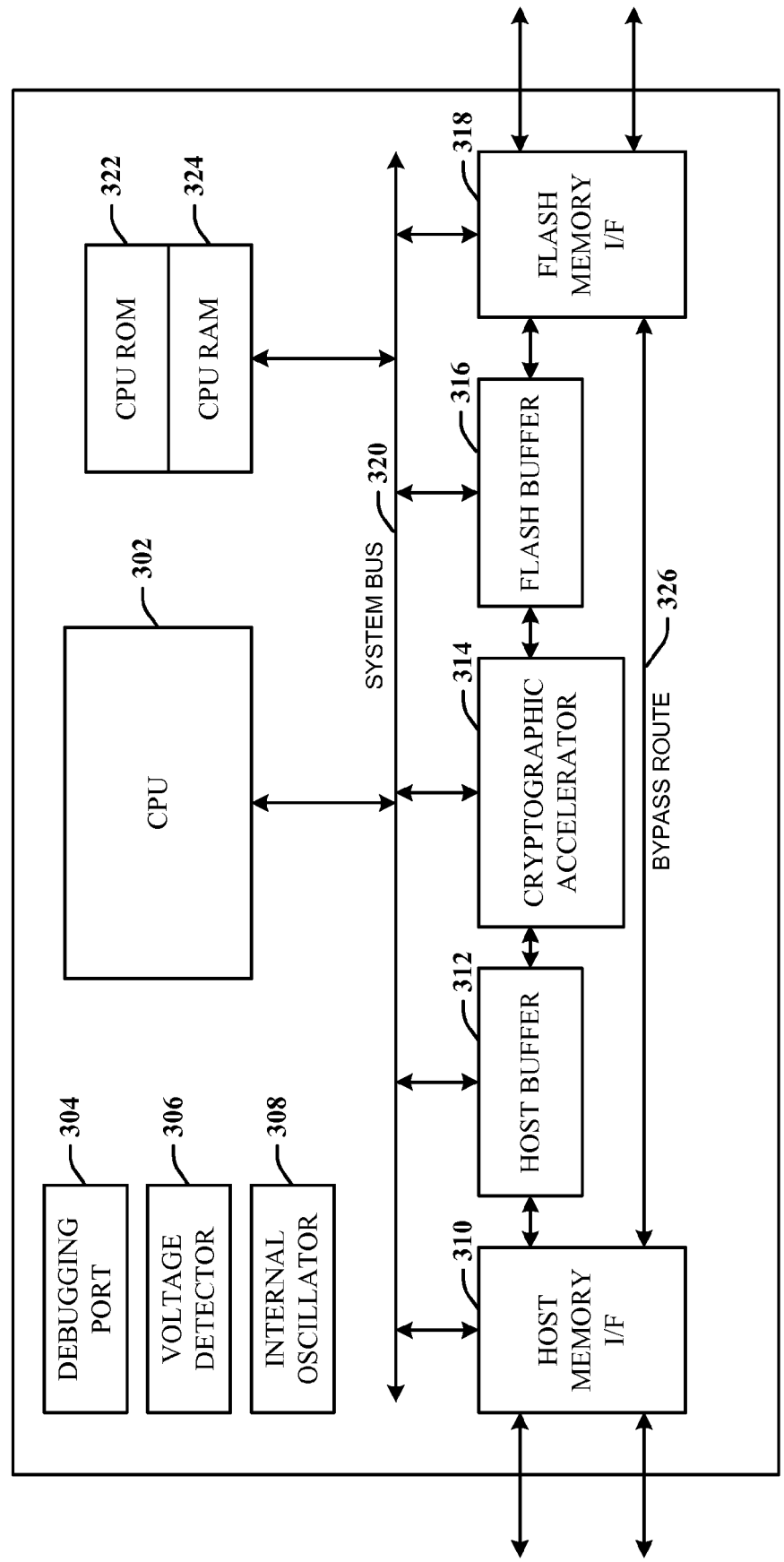
FIG. 3 illustrates a block diagram of a security processor of the memory module.

In more detail, FIG. 3 illustrates the components of a security processor 300. The security processor 300 includes a central processing unit (CPU) 302 or any other type of application processor. The CPU 302 within the security processor 300 can manage the flash memory storage (not shown) and provide a secure environment to implement authentication algorithms and security software. The security processor 300 also includes a Joint Test Action Group (JTAG) port 304 that prevents tampering and/or a mechanism for debugging the system, a voltage detector 306 that indicates the voltage level of the security processor 300, and an internal oscillator 308 that provides a clock for the security processor 300. However, other mechanisms (not shown) can be provided that help prevent tampering. For example, temperature detecting, metal overlay (to hide signals), and scrambling of signals are additional methods that can be utilized in the security processor 300. A host memory interface (I/F) 310 handles all the flash memory transactions with a host processor (not shown). Specifically the host memory I/F 310 manages signaling, thus complying with the interface definitions of the flash memory. The host memory I/F 310 also manages interpretation or differentiating between a secure and non-secure request, and monitoring requests via enforcing access rights and permissions.

A host buffer 312 holds data for secured transactions to and from the host processor. The host buffer 312 enables processing of a page while receiving the next page. The buffer 312 also serves as a mailbox between the CPU 302 and the host processor, wherein interpretation of the messages is carried out by the CPU 302. A cryptographic accelerator 314 that performs all the cryptographic algorithms, symmetric and a-symmetric needed by the system. The CPU 302 configures the cryptographic accelerator 314 and can control the data flow through the security processor 300. The CPU 302 interfaces a system bus 320 and the security applications that run on the CPU 302, arbitrating with the host processor. A flash buffer 316 holds data to and from the flash memory. The flash buffer 316 enables processing of a page while receiving the next page. A flash memory I/F 318 that handles all transactions to and from the flash memory storage and the security processor 300, such as signaling and interpretation.

A system bus 320 that allows the CPU 302 to communicate with the different components of the security processor 300. The system bus 320 is a very high level representation of the internal bus, not all components need to be connected directly to one another on the same bus. CPU ROM/RAM 322 and 324 contains code and data used by the CPU 302. The ROM 322 stores the CPU boot loader (not shown). Further, resident code and code overlays execute from the integrated CPU RAM 324. In operation, the host processor communicates with the security processor 300 and accesses the flash memory directly via a bypass route 326. Or, the host processor can communicate via the memory manager (not shown) running on the security processor 300 and access the flash memory through communications with the memory manager. In either case, access rights are enforced by the security processor 300 according to the security software embedded in the flash memory.

Figure 4:
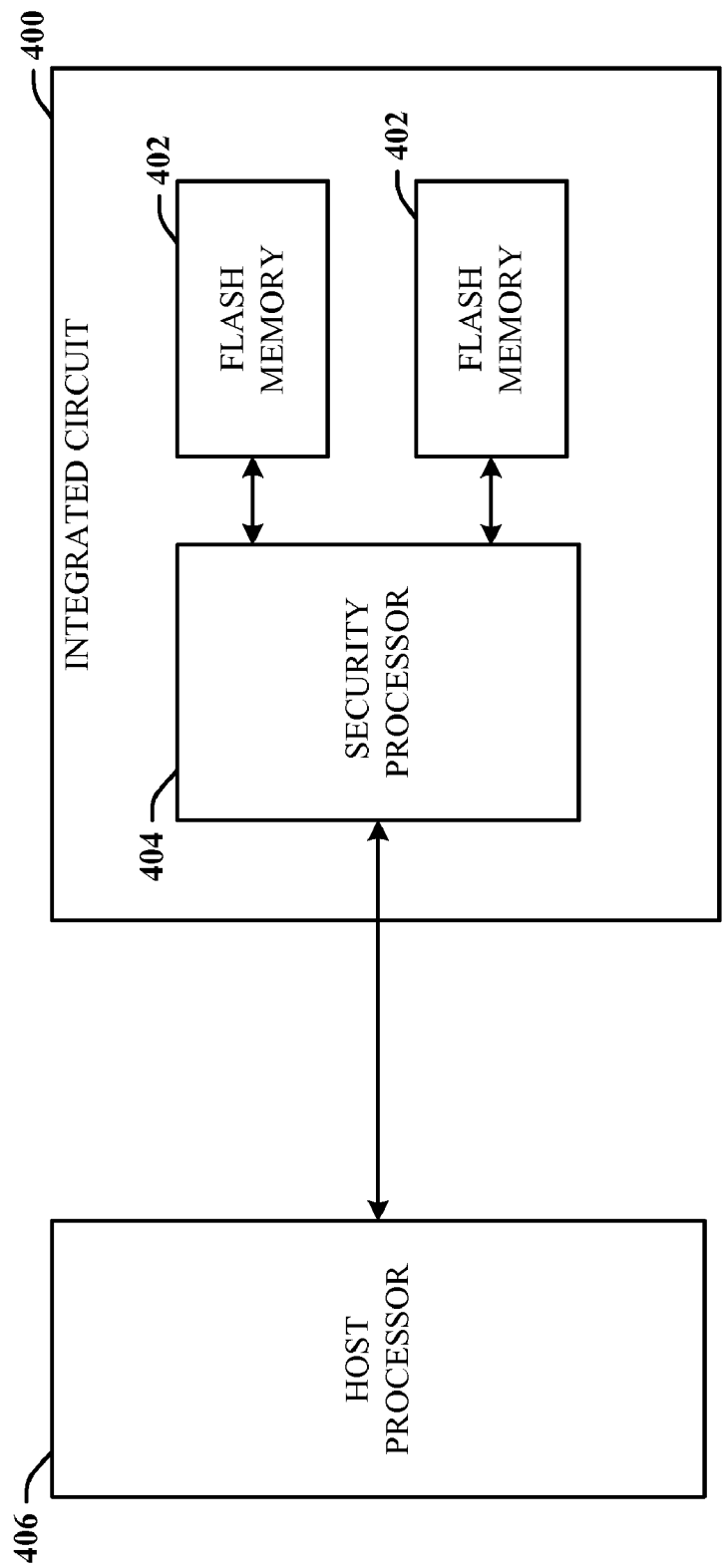
FIG. 4 illustrates a block diagram of a memory module integrated into a single integrated circuit.

In another embodiment as illustrated in FIG. 4, an integrated circuit/silicon chip 400 facilitates integrated security capabilities in accordance with an innovative aspect. The integrated circuit 400 includes non-volatile or flash memory 402 and a security processor 404. The flash memory 402 stores security software for use by the security processor 404. As stated supra, the security software included all or a portion of password authentication software, shared key authentication software, PKI authentication software, integrity check software, encryption/decryption software, anti-virus software, anti-spyware software, and any other type of security software available. All or a portion of the security software is directly embedded into the flash memory 402 to provide integrated security capabilities at a chip level.

The security processor 404 accesses the security software from the flash memory 402 and performs security functions based on the specific security software stored. The security processor 404 controls the entire flash memory storage and monitors all traffic to and from the flash memory components 402. The security processor 404 also arbitrates with a host processor 406 to control access to the flash memory 402. Further, the security processor 404 and flash memory 402 are tightly coupled together onto a single integrated circuit 400, allowing security software to be embedded into the flash memory 402 at a chip level.

Embedding security functionality directly into the flash memory 402 which is coupled to the security processor 404 on a single integrated circuit 400, provides security functionality that is less susceptible to degradation and/or tampering. Accordingly, the security processor 404 provides for concurrent processing of security protocols while the host processor 406 executes normal functions. This concurrent processing by the security processor 404, alleviates the host processor 406 from having to execute interrupts associated with security functions. Furthermore, both the security processor 404 and host processor 406 coordinate read/write access to the flash memory 402 so as to optimize processor/memory utilization while ensuring a heightened level of security. Alternatively, security software may also be embedded in another flash memory that sits in series with the integrated security processor 404 and flash memory 402. The integrated security processor 404 then accesses the separate flash memory and arbitrates with the host processor 406 to control access to the separate flash memory and to coordinate read/write access to the separate flash memory. Furthermore, additional flash memory devices may be connected through a flash interface (similar to the interface of FIG. 2) to the flash memory 402 embedded within the integrated circuit 400.

The memory module of the present system facilitates integrated security capabilities. In operation, security software is embedded directly into the flash memory. A security processor then controls the entire flash memory storage and monitors all traffic to and from the flash memory components. Further, the security processor provides for concurrent processing of security protocols while a host processor executes normal functions. Allowing the security processor to control the security functionality of the flash memory, alleviates the host processor from having to execute interrupts associated with security functions. Accordingly, both the security processor and the host processor coordinate read/write access to the flash memory so as to optimize processor/memory utilization while ensuring a heightened level of security.

Further, the memory module provides for authentication services and secure channel communications based on this heightened level of security it has established. Authentication services and secure channel communications can be utilized in a variety of applications to create a secure environment. For example, the memory module can provide security for secure partitioning, secure boot, virus rollback, firmware over the air update (FOTA), near field communication (NFC) secure payment, digital rights management, enterprise remote data management and mobile TV broadcasting.

Figure 5:
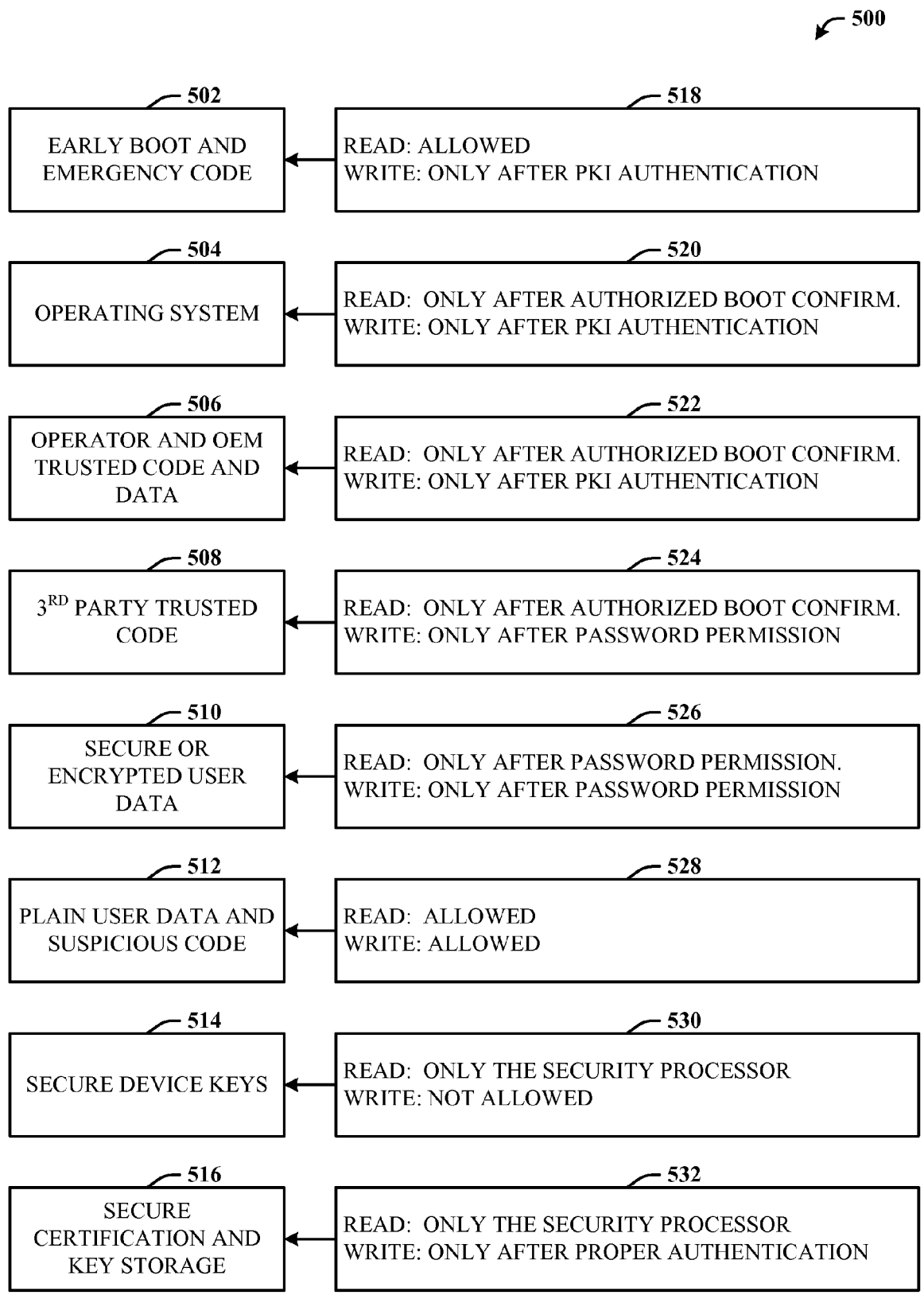
FIG. 5 illustrates a block diagram of a partitioned flash memory of the memory module.

For example, FIG. 5 illustrates the secure memory partitions 500 of a flash memory space. Secure Partitioning is utilized to protect essential data and code, secure sensitive information, and allow easy access to common public data. Secure Partitioning allows separate access controls to different partitions of data which could be made available based on user, service provider, original equipment manufacturer (OEM), enterprise authentication, or any other type of authentication available. Specifically as illustrated in FIG. 5, the memory space is divided into multiple partitions with associated access rights. The access rights distinguish between read and write (or erase) permissions. The access rights also include the ability to change access rights as permissions are granted and/or denied, so that multiple users who have access rights to a shared partition can all access the shared partition.

Further, the access rights support different security levels of authentication. Accordingly, some objects can utilize higher levels of protection than others. For example, the partition that stores the operating system is protected more securely than a partition that stores a downloaded game. The access rights also support remote users who do not assume that the host is trusted. Authentication of a remote user must work correctly even if the host is not trusted. In addition to the access rights, partitions are made inaccessible when an associated mobile handset is not in a trusted state.

As shown in FIG. 5, the flash memory space is partitioned into eight segments. The flash memory space may be partitioned into as many segments as needed, limited to either software or hardware. Each partition contains specific read/write (or erase) access rights as shown at the right of FIG. 5. Each partition also contains an access right that specifies "who" can change the read/write (erase) access rights.

Specifically, early boot and emergency code 502 includes access rights such that read access is allowed but write (or erase) is allowed only after PKI authentication 518. The operating system 504 allows read access only after authorized boot confirmation and write (or erase) access only after PKI authentication 520. The operator and OEM trusted code and data 506 allows read access only after authorized boot confirmation and write (or erase) access only after PKI authentication 522. Third party trusted code 508 allows read access only after authorized boot confirmation and write (or erase) access only after User Password Permission 524. Secure or encrypted user data 510 allows read and write (or erase) access only after user password permission is received 526.

Plain user data and suspicious code 512 allows read and write (or erase) access without any security constraints 528. Secure device keys 514 allows only the security processor (not shown) read access and does not allow write (or erase) access 530. Secure certification and key storage 516 allows only the security processor read access and allows write (or erase) access only after proper authentication 532. The read and write (or erase) security constraints disclosed in FIG. 5 are just some of the security constraints that can be applied to the secure memory partitions of the flash memory space, any security constraints can be applied to the partitions depending on the security access required and/or requested. Furthermore, life-cycle stages can also control the security functionality access. Life-cycle stages include, but are not limited to, the manufacturing stage, development stage, vendor stage, service provider stage, secure (end user) stage and returned materials stage. For example, the life-cycle stages can exhibit a one-way flow wherein anything done on a previous stage is fixed once a stage transition occurs. Further, the main purpose of having life-cycle stages is to provide the flexibility needed during the pre-user stages and at the same time to enforce the security required during the end user stage.

FIGS. 6-10 illustrate methodologies of facilitating integrated security capabilities according to various aspects of the innovation. While, for purposes of simplicity of explanation, the one or more methodologies shown herein (e.g., in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 6:
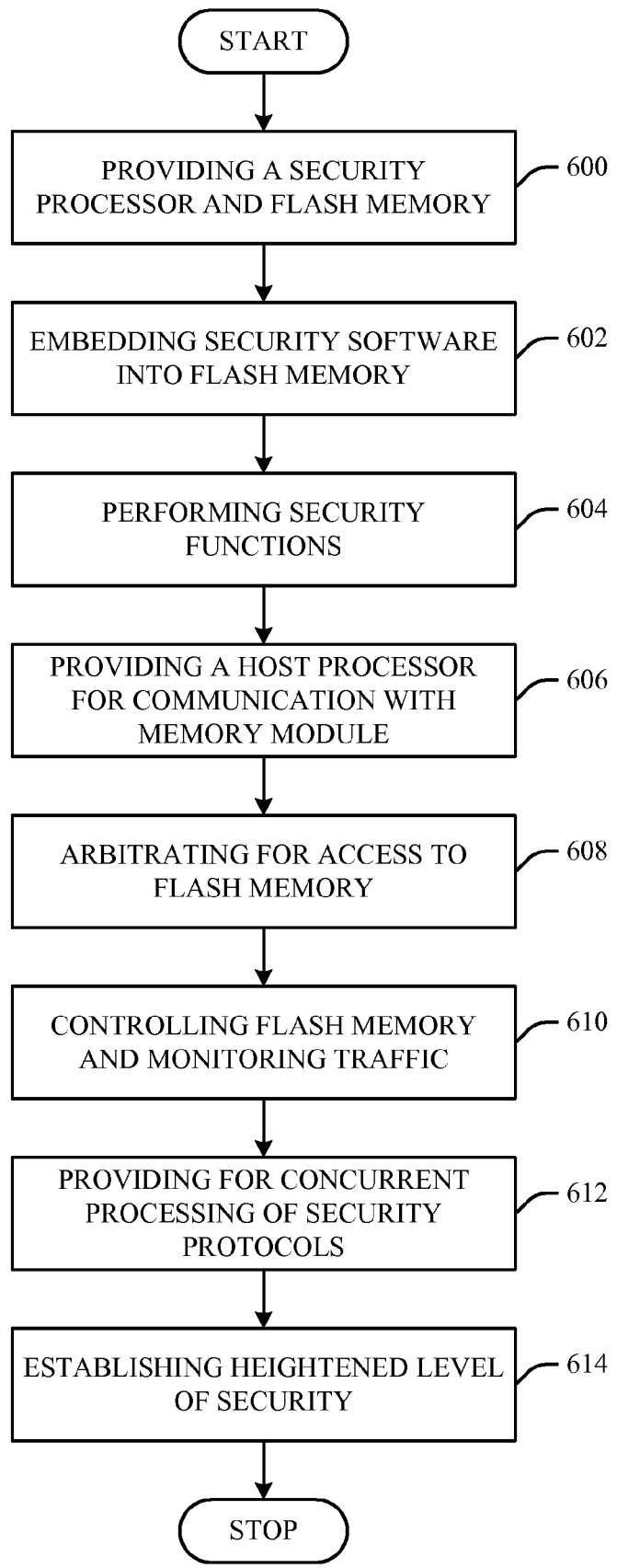
FIG. 6 illustrates a flow chart of a method of creating a heightened level of security via the memory module.

Referring to FIG. 6, a method of optimizing processor utilization and creating a heightened level of security is illustrated. At 600, a security processor and flash memory are provided within a memory module. The memory module is a package of multiple chips or integrated circuits, wherein one integrated circuit houses the security processor and another integrated circuit houses the flash memory. The integrated circuits are then coupled together to form the memory module. Alternatively, the security processor and the flash memory may be integrated into one chip or integrated circuit. Furthermore, other components may be included within the memory module, such as volatile memory (or RAM), Near Field Communications (NFC) components, etc. At 602, security software is embedded into the flash memory. The security software includes password authentication software, shared key authentication software, PKI authentication software, integrity check software, encryption/decryption software, anti-virus software, anti-spyware software, etc. It is thus to be understood that any suitable security software and algorithms are contemplated and intended to fall under the scope of the hereto-appended claims.

At 604, security functions are performed via the embedded security software. And at 606, a host processor is provided that communicates with the memory module. The security processor of the memory module sits in series with the host processor and the flash memory. At 608, the security processor arbitrates with the host processor for access to the flash memory. The security processor manages the flash memory and provides a secure environment to implement authentication algorithms and security software stored within the flash memory. At 610, the security processor controls the entire flash memory storage and monitors all traffic to and from the flash memory components and enforces the access rights associated with the memory partitions.

At 612, the security processor provides for concurrent processing of security protocols while the host processor executes normal functions. Allowing the security processor to control the security functionality of the flash memory, alleviates the host processor from having to execute interrupts associated with security functions. And at 614, the memory module in communication with the host processor establishes a heightened level of security that can be utilized in authentication services and secure channel communications. Accordingly, both the security processor and the host processor coordinate read/write access to the flash memory so as to optimize processor/memory utilization while ensuring a heightened level of security.

Figure 7:
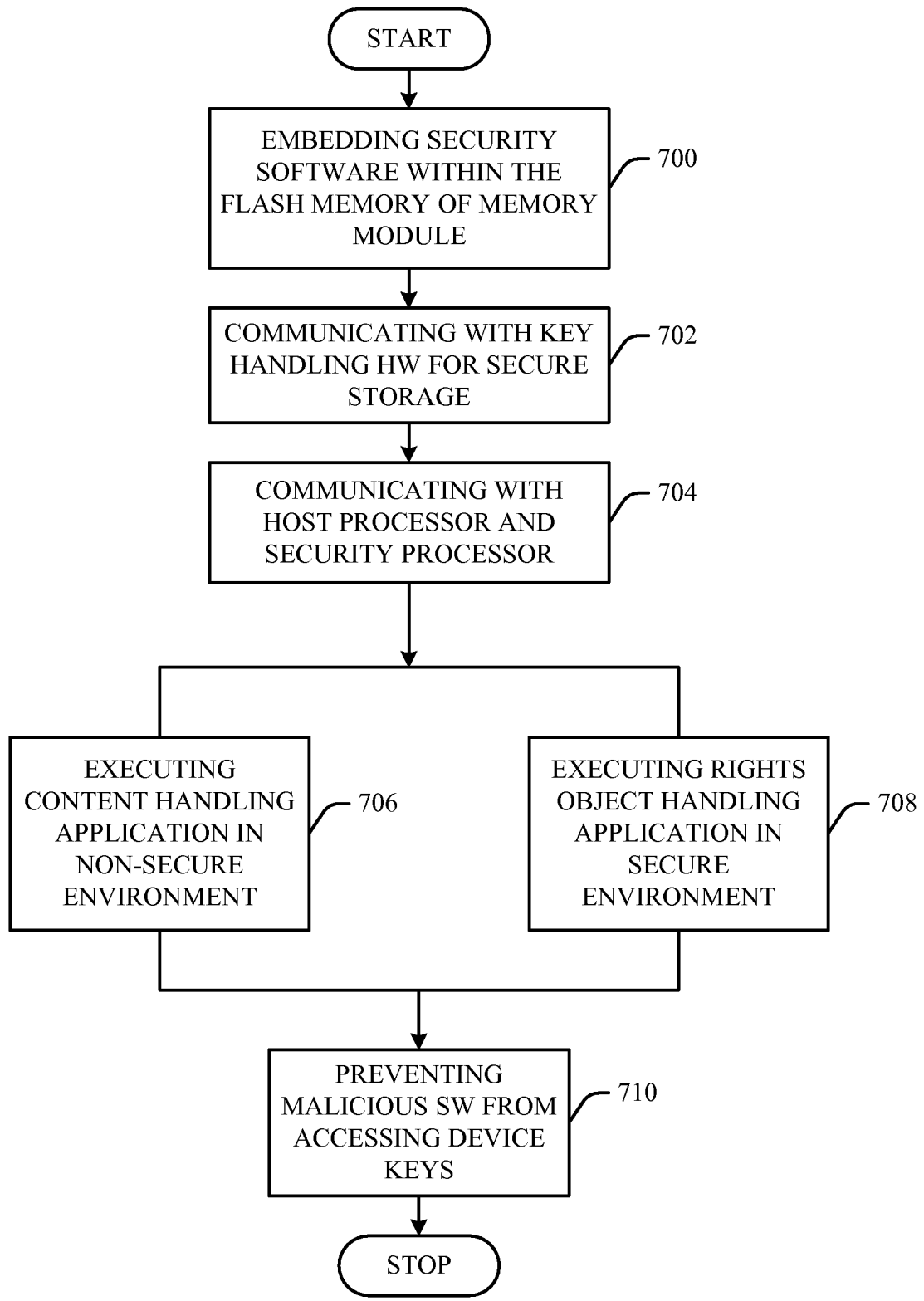
FIG. 7 illustrates a flow chart of a method of providing a secure storage and execution environment via the memory module.

Referring to FIG. 7, a method of providing a secure storage and execution environment is illustrated. At 700, security software is embedded within the flash memory of the memory module. The security software is generally any security software that protects an asset(s), such as device keys, and can be specific to the asset to be protected. At 702, the flash memory communicates with key handling hardware to provide a secure storage device for the device keys. At 704, application code containing content handling and rights object handling communicates with a host processor and a security processor of the memory module.

Specifically, the content handling application of the application code executes in a less secure environment and communicates directly with the host processor at 706. The content handling application is the non-secure part of an application and does not need to be executed in the secure environment and thus can communicate directly with the host processor. At 708, the rights object handling application of the application code executes in a secure environment and communicates directly with the security processor. The rights object handling application is the secure part of the application and therefore is executed in the secure environment provided by the memory module.

In contrast, conventional systems execute both the content handling application and rights object handling application in a less secure environment, wherein both the content handling and rights object handling applications communicate directly with the host processor. Executing both content handling and rights object handling in a less secure environment allows the rights object handing application to be susceptible to malicious software attacks. Whereas at 710, malicious software is prevented from accessing the device keys of the present system because the rights object handling application is executed in the secure environment created by the memory module.

The memory module of the present system facilitates integrated security capabilities. As stated supra, the memory module includes non-volatile or flash memory that stores security software for use by a security processor. The security processor accesses the security software from the flash memory and performs security functions based on the specific security software stored. Accordingly, the security processor controls the entire flash memory storage and monitors all traffic to and from the flash memory components. This establishes a heightened level of security which optimizes processor/memory utilization. Using this heightened level of security, the memory module provides for authentication services and secure channel communications.

Authentication services utilized by the memory module include password authentication, shared key authentication and PKI authentication. These authentication services are used in association with three types of authentication. Type 1 is authenticating a user to the secure flash memory, type 2 is authenticating a host processor to the secure flash memory and type 3 is authenticating a server to the secure flash memory. Further, in addition to authentication applications may require secure channel communications. The memory module provides for two types of secure channel communications used in association with the authentication services. Type 1 establishes a secure channel of communication from a host processor to the flash memory and type 2 establishes a secure channel of communication from a back end server to the flash memory.

These authentication services and/or secure channel communications can be used in a variety of applications to create a secure environment. For example, the memory module can provide security for secure partitioning, secure boot, virus rollback, FOTA, NFC secure payment, digital rights management, enterprise remote data management and mobile TV broadcasting.

Figure 8:
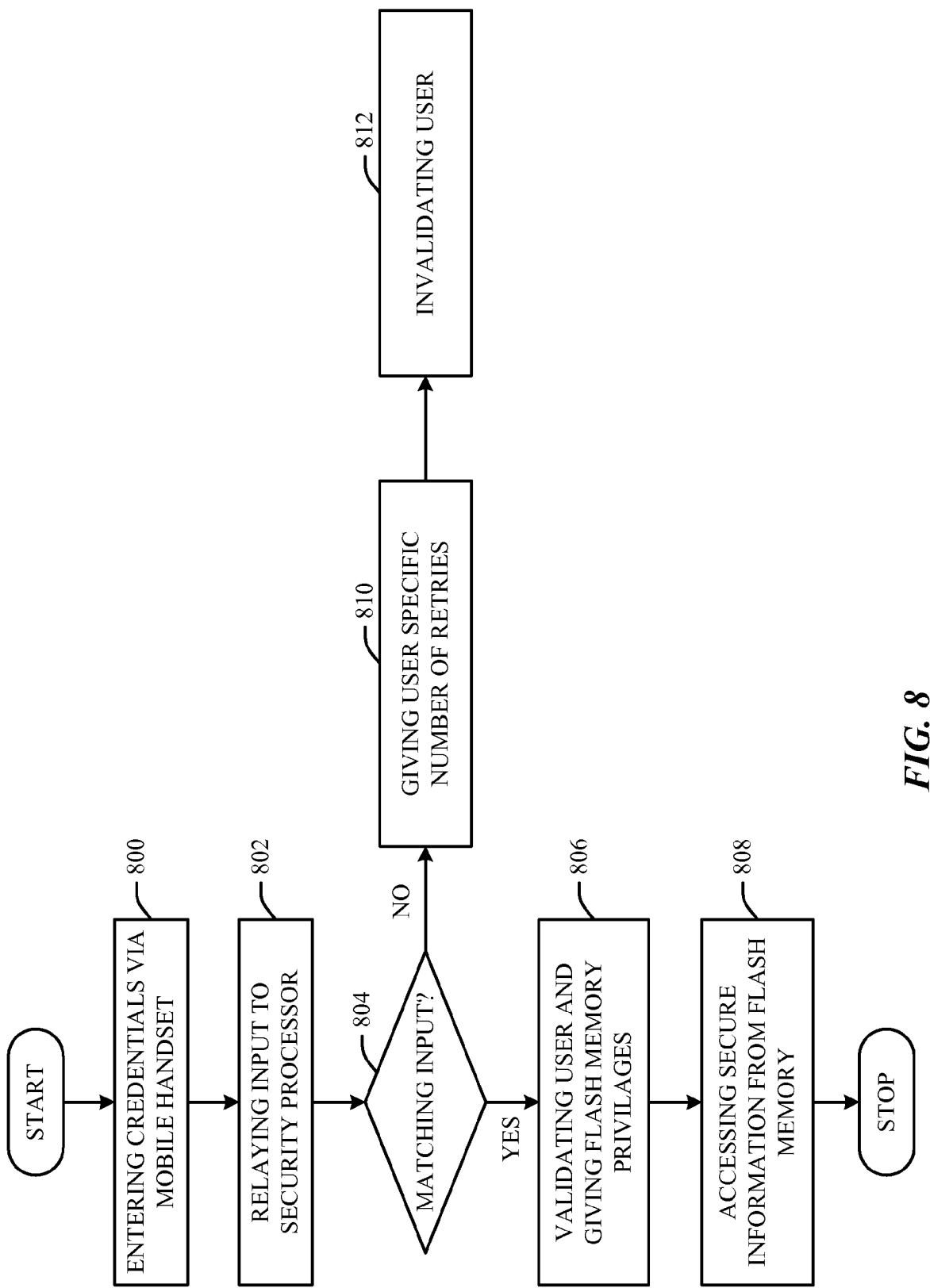
FIG. 8 illustrates a flow chart of a method of authenticating a user to the secure flash memory.

For example, FIG. 8 illustrates a method for authenticating a user to the secure flash memory (Type 1 Authentication). At 800, the user enters credentials to the memory module via the mobile handset. At 802, the input is relayed to the security processor of the memory module. At 804, the input is matched with the signature maintained in the security processor partition. If the signature and input match, then at 806 the user is validated and appropriate flash memory privileges are given to the user for a specific period of time. And at 808, the user accesses secure information from the flash memory. If the signature and input do not match, then at 810 the user is given a specific number of retries. If the user continues to enter non-matching input, then at 812 the user is invalidated, flash memory privileges are denied and the user is locked-out for a specific period of time.

Figure 9:
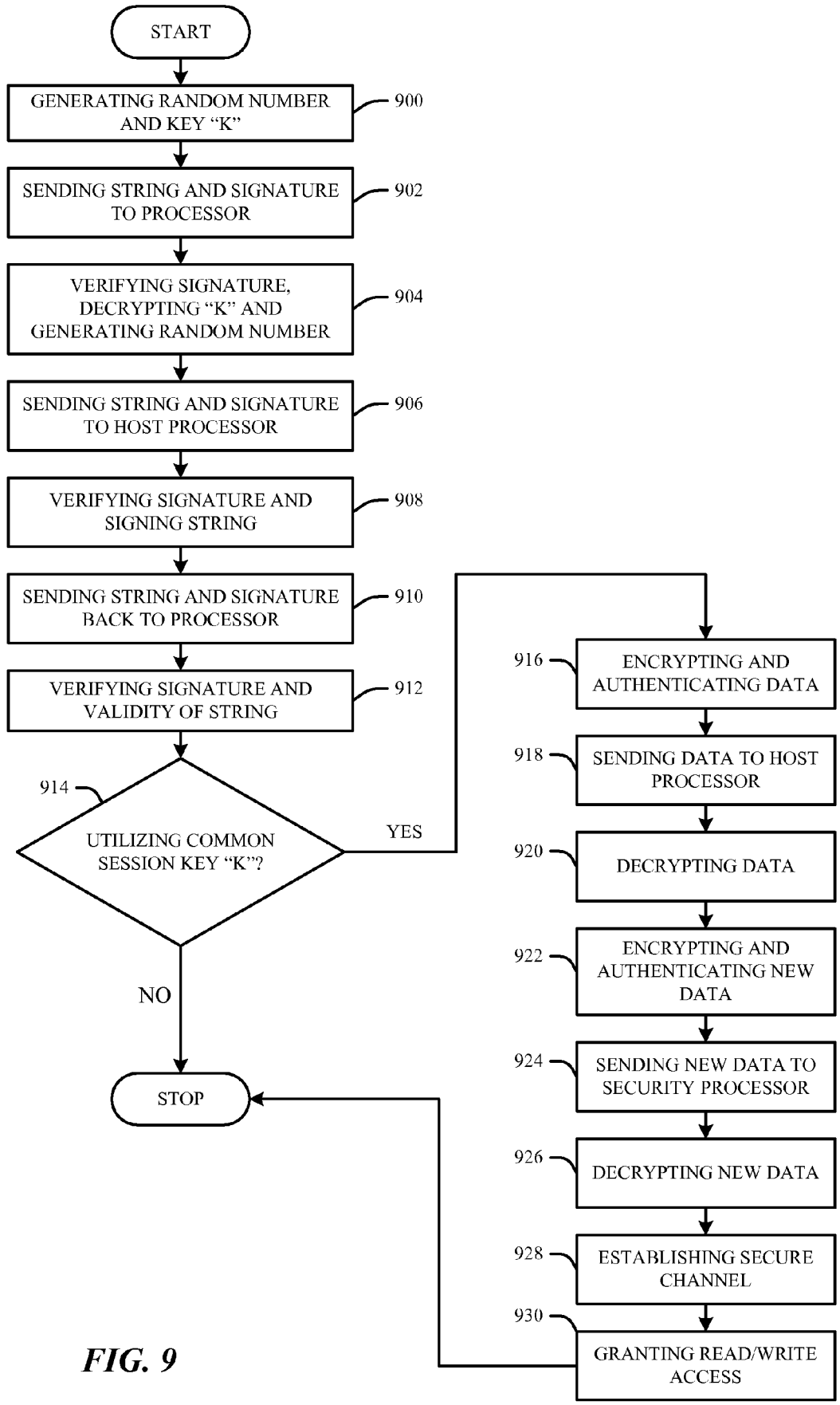
FIG. 9 illustrates a flow chart of a method of authenticating a host processor to the secure flash memory.

Referring to FIG. 9, a method for authenticating a host processor to the secure flash memory is illustrated (Type 2 Authentication). At 900, the host processor generates a random number and symmetric key "K", the host processor encrypts "K" under the security processor's public key and signs the whole string under the host processor's own private key. At 902, the host processor sends the string and signature to the security processor. At 904, the security processor verifies the signature and checks the string's ID, decrypts "K" and generates a random number and signs the whole string. At 906, the security processor sends the string and signature to the host processor. At 908, the host processor verifies the signature and checks the random number string and ID and signs the string. At 910, the host processor sends the string and signature back to the security processor. At 912, the security processor verifies the signature and checks the validity of the string. At 914, both the security processor and host processor utilize the generated, common session key "K" if secure channel communications are needed.

After authentication, a secure channel can then be established between the host processor and the flash memory (Type 1 Secure Channel). After authentication, at 916, the generated session key "K" is utilized and the security processor encrypts and authenticates data with the session key "K". At 918, the security processor then sends the data to the host processor. At 920, the host processor decrypts the data with the session key "K" and checks for integrity. At 922, the host processor processes the information and encrypts and authenticates new data with the session key "K". At 924, the host processor then sends the new data to the security processor. And, at 926, the security processor decrypts the new data with the session key "K" and checks the integrity of the data. Once the integrity is verified, at 928 a secure channel is derived by using the session key "K" for exchanging data between the host processor and the security processor. The encryption with authentication provides the necessary security. Once the secure channel is established, at 930 read/write access is granted to the host processor and malicious software/agents are prevented from read and/or write access.

Figure 10:
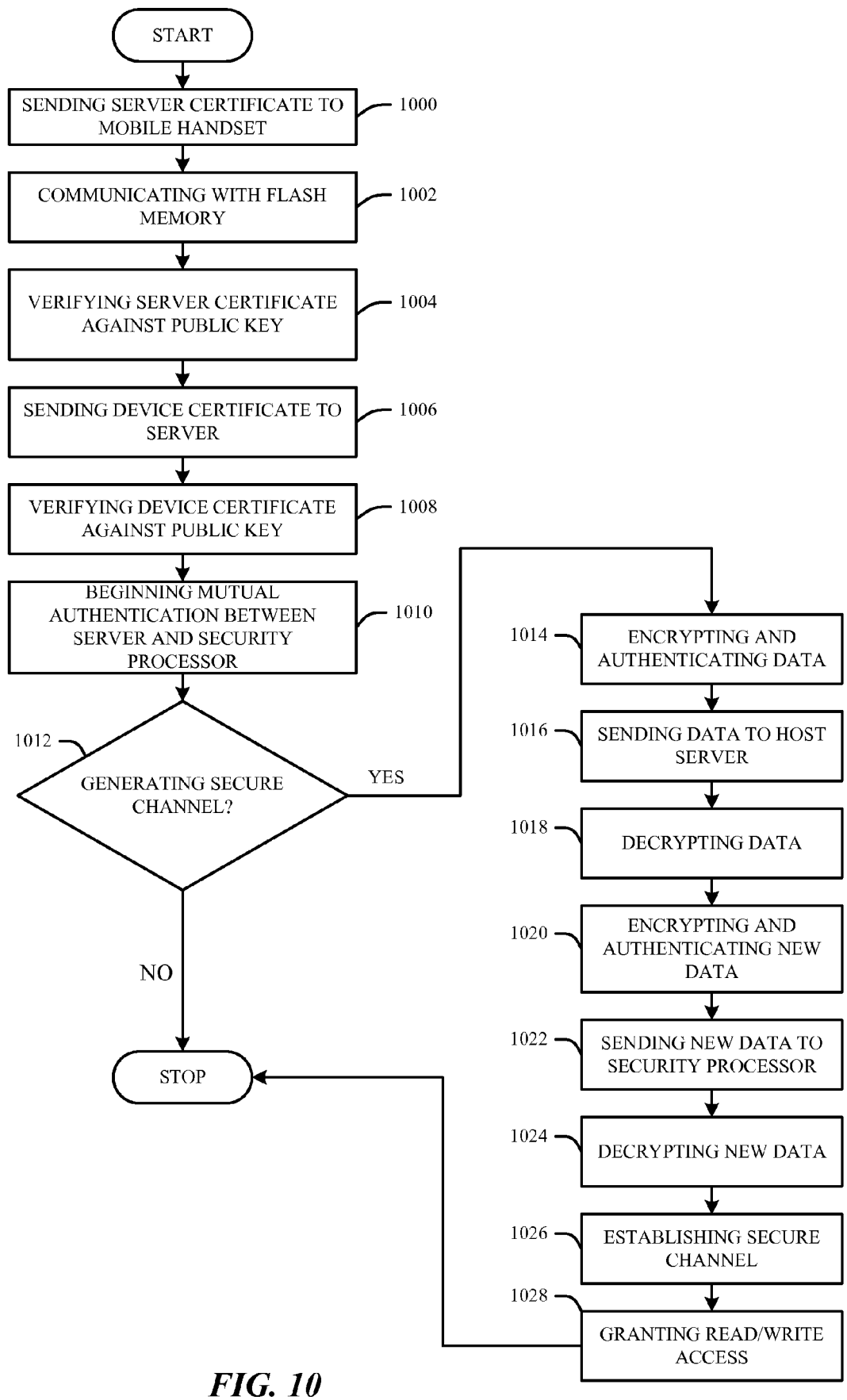
FIG. 10 illustrates a flow chart of a method of authenticating a server to the secure flash memory.

Referring to FIG. 10, a method for authenticating a server to the secure flash memory is illustrated (Type 3 Authentication). At 1000, the server sends a server certificate to the mobile handset. At 1002, the security processor of the mobile handset communicates with the flash memory containing the embedded security software for the mobile handset. At 1004, the security processor verifies the server certificate against the public key. If the server certificate is correct, at 1006 the security processor sends a device certificate to the server. At 1008, the server verifies the device certificate against the public key. And if the device certificate is verified, then at 1010 mutual authentication between the server and the security processor begins.

After authentication, a secure channel can then be established between the server and the flash memory (Type 2 Secure Channel) at 1012. After authentication, at 1014, a session key is generated and the security processor encrypts and authenticates data with the session key. At 1016, the security processor then sends the data to the server. At 1018, the server decrypts the data with the session key and checks for integrity. At 1020, the server processes the information and encrypts and authenticates new data with the session key. At 1022, the server then sends the new data to the security processor. And, at 1024, the security processor decrypts the new data with the session key and checks the integrity of the data. Once the integrity is verified, at 1026 a secure channel is derived by using the session key for exchanging data between the server and the security processor. The encryption with authentication provides the necessary security. Once the secure channel is established, at 1028 read/write access is granted to the server and malicious software/agents are prevented from read and/or write access.

Figure 11:
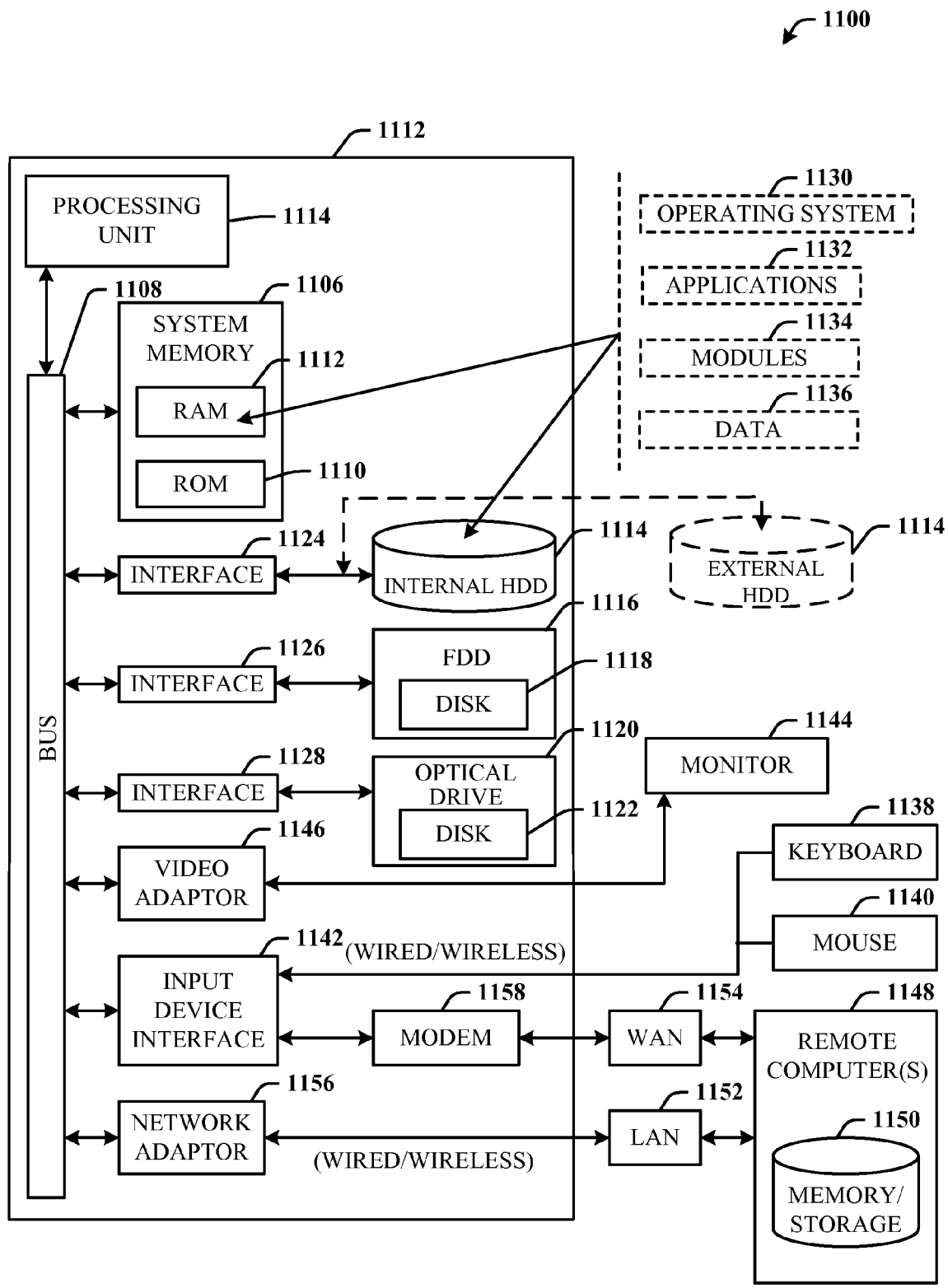
FIG. 11 illustrates a block diagram of a computer operable to execute the disclosed memory module architecture.

Referring now to FIG. 11, there is illustrated a block diagram of a computer operable to execute the disclosed memory module architecture. In order to provide additional context for various aspects thereof, FIG. 11 and the following discussion are intended to provide a brief, general description of a suitable computing environment 1100 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1102 through one or more wired/wireless input devices (e.g., a keyboard 1138 and a pointing device, such as a mouse 1140). Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks (e.g., a wide area network (WAN) 1154). Such LAN and WAN networking environments are commonplace in offices and companies, and facilitate enterprise-wide computer networks, such as intranets, all of which may connect to a global communications network (e.g., the Internet).

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices (e.g., computers) to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
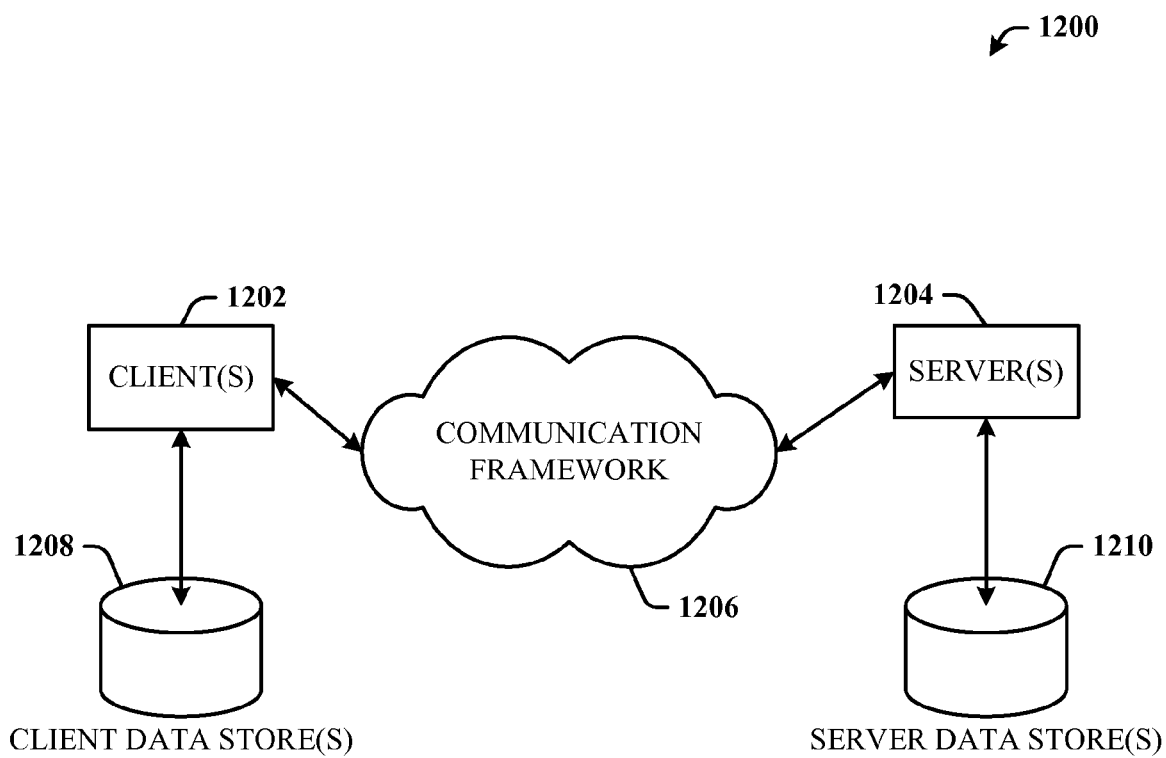
FIG. 12 illustrates a schematic block diagram of an exemplary computing environment for use with the memory module.

Referring now to FIG. 12, there is illustrated a schematic block diagram of an exemplary computing environment 1200 in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the subject innovation, for example.

The system 1200 also includes one or more server(s) 1204. The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus that facilitates integrated security capabilities, comprising:
    a memory module that includes non-volatile memory that stores security software; and a security processor that:
  accesses the security software from the non-volatile memory;
  performs security functions based on the stored security software;
  controls the non-volatile memory and monitors traffic to and from the non-volatile memory;
  exclusively executes interrupts associated with the security software;
  controls a cryptographic accelerator that supports the encryption and decryption of data;
  coordinates read and write operations to the non-volatile memory with a host processor, wherein a first integrated circuit comprises the security processor and a second integrated circuit comprises the host processor;
executes a rights object handling application stored in a first partition of the non-volatile memory in a heightened security environment and the host processor contemporaneously executes a content handling application stored in a second partition of the non-volatile memory in a lessened security environment, wherein the rights object handling application is a secure part of the non-volatile memory that communicates exclusively with the security processor and the content handling application is a non-secure part of the non-volatile memory that communicates directly with the host processor;
  the security processor comprising:
    the cryptographic accelerator that supports the encryption and decryption of data between the host processor and the flash memory, the cryptographic accelerator enables the flash memory to be an encrypted storage device;
    a flash buffer that holds data to and from the flash memory such that a first page can be processed as a second page is received;
    a joint test action group port that prevents tampering and serves as a mechanism for debugging the security processor; and
    a CPU that controls the data flow through the security processor,
  the host processor arbitrates with the security processor for access to the non-volatile memory, and the security processor sits in series with the host processor and the non-volatile memory.

2. The apparatus of claim 1, further comprising volatile memory used for primary storage that directly communicates with the host processor.

3. The apparatus of claim 1, wherein the non-volatile memory is a flash memory.

4. The apparatus of claim 1, wherein the security software comprises password authentication software, key authentication software, integrity check software, encryption/decryption software, and at least one of anti-virus software or anti-spyware software.

5. The apparatus of claim 1, wherein the non-volatile memory is divided into multiple partitions of varying sizes and access rights, and wherein access rights are assigned to the partitions based on security requirements established for each partition.

6. The apparatus of claim 1, wherein the host processor accesses at least the second partition via a bus which bypasses the CPU within the security processor, if authentication is validated.

7. The apparatus of claim 1, wherein the non-volatile memory is integrated on the first integrated circuit.

8. The apparatus of claim 1, wherein the security processor and non-volatile memory are located on disparate integrated circuits.

9. A method of optimizing processor utilization and creating a heightened level of security, comprising:
  providing a security processor and a flash memory within a memory module, wherein the security processor executes all interrupts associated with a security function and is located in a first integrated circuit;
  embedding security functionality directly into the flash memory;
  performing security functions via the embedded security functionality;
  providing a host processor that is located in a second integrated circuit and that communicates with the memory module;
  providing volatile memory that communicates with the host processor;
  arbitrating with the security processor and host processor for access to the flash memory;
  monitoring traffic to and from the flash memory and enforcing access rights;
  establishing a heightened level of security environment and a lesser level of security environment, the heightened level of security environment is utilized in authentication services and secure channel communications to execute a rights handling application stored in a first partition of the flash memory and the lesser level of security environment is contemporaneously employed to execute a content handling application stored in a second partition of the flash memory, wherein the rights handling application is a secure part of the flash memory that communicates exclusively with the security processor and the content handling application is a non-secure part of the flash memory that communicates directly with the host processor;
  encrypting and decrypting data between the host processor and the flash memory;
  holding data to and from the flash memory such that a first page can be processed as a second page is received;
  preventing tempering of and debugging the security processor; and
  controlling the data flow through the security processor;
    wherein the security processor comprising:
      the cryptographic accelerator that supports the encryption and decryption of data between the host processor and the flash memory, the cryptographic accelerator enables the flash memory to be an encrypted storage device;
      a flash buffer that holds data to and from the flash memory such that a first page can be processed as a second page is received;
      a joint test action group port that prevents tampering and serves as a mechanism for debugging the security processor; and
      a CPU that controls the data flow through the security processor,
    the host processor arbitrates with the security processor for access to the non-volatile memory, and the security processor sits in series with the host processor and the non-volatile memory.

10. The method of claim 9, further comprising coordinating read/write access to the flash memory between the security processor and host processor.

11. The method of claim 9, wherein the authentication services comprise password authentication, and at least one of shared key authentication or PKI authentication.

12. The method of claim 11, wherein the authentication services are used in association with authenticating a user to the flash memory, authenticating the host processor to the flash memory and authenticating a server to the flash memory.

13. The method of claim 12, wherein the secure channel communications comprise at least one of establishing a secure channel of communications between the host processor and the flash memory and establishing a secure channel of communications between a server and the flash memory.

14. An apparatus, comprising:
an integrated circuit that includes a flash memory that stores security software;
a security processor that accesses the security software to perform security functions at a chip level, the security processor includes a port that prevents tampering of the apparatus, wherein the security processor and a host processor, which is located outside of the integrated circuit, create an environment with a heightened security level and an environment with a lesser security level, the security processor executes code containing a rights handling application stored in a first partition of the flash memory in the environment with the heightened security level while the host processor concurrently executes code containing a content handling application stored in a second partition of the flash memory in the environment with the lesser security level, and the host processor arbitrates with the security processor for access to the flash memory;
wherein the flash memory and the security processor are tightly coupled together, and
wherein the rights handling application is a secure part of the flash memory that communicates exclusively with the security processor and the content handling application is a non-secure part of the flash memory that communicates directly with the host processor;
the security processor comprising:
a cryptographic accelerator that supports the encryption and decryption of data between the host processor and the flash memory, the cryptographic accelerator enables the flash memory to be an encrypted storage device;
a flash buffer that holds data to and from the flash memory such that a first page can be processed as a second page is received;
a joint test action group port that prevents tampering and serves as a mechanism for debugging the security processor; and
a CPU that controls the data flow through the security processor,
the security processor sits in series with the host processor and the non-volatile memory.

15. The apparatus of claim 14, wherein the flash memory and the security processor are coupled together without utilizing a system bus.

16. The apparatus of claim 14, wherein the flash memory is divided into multiple partitions of varying sizes and access rights.

17. The apparatus of claim 14, further comprising additional flash memory components connected through a flash interface to the flash memory tightly coupled to the security processor.

18. The apparatus of claim 14, wherein the security processor comprises:
a CPU that controls the data flow through the security processor;
a cryptographic accelerator that performs all the cryptographic algorithms; and
a flash buffer that holds data to and from the flash memory.

* * * * *